(12) United States Patent
Kwon (10) Patent No.: US 11,745,798 B2
(45) Date of Patent: Sep. 5, 2023

(54) SKATEBOARD PLATFORM FOR ELECTRIC VEHICLE (71) Applicants: Hyundai Motor Company, Seoul (KR); Kia Corporation, Seoul (KR)

(72) Inventor: Ho Sung Kwon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 64 days.

(21) Appl. No.: 17/507,069

(22) Filed: Oct. 21, 2021

(65) Prior Publication Data

US 2022/0363315 A1 Nov. 17, 2022

(30) Foreign Application Priority Data

May 17, 2021 (KR) .......................... 10-2021-0063642

(51) Int. Cl.
*B60K 1/04* (2019.01)
*B62D 21/10* (2006.01)
*B60L 50/60* (2019.01)
*B62D 21/18* (2006.01)

(52) U.S. Cl.
CPC ................ *B62D 21/10* (2013.01); *B60K 1/04* (2013.01); *B60L 50/66* (2019.02); *B62D 21/18* (2013.01); *B60K 2001/0438* (2013.01); *B60Y 2200/91* (2013.01)

(58) Field of Classification Search
CPC ...... B62D 21/10; B62D 21/18; B62D 63/025; B62D 21/03; B62D 27/06; B60K 1/04; B60K 2001/0438; B60L 50/66; B60Y 2200/91
See application file for complete search history.

(56) References Cited

U.S. PATENT DOCUMENTS

| 9,577,227 | B2 | 2/2017 | Sumpf et al. |
| 2013/0206496 | A1* | 8/2013 | Hashimoto ............ B62D 21/12 180/291 |
| 2019/0001803 | A1 | 1/2019 | Hara et al. |
| 2019/0081297 | A1 | 3/2019 | Nakamori et al. |
| 2020/0243811 | A1 | 7/2020 | Park |
| 2020/0384842 | A1* | 12/2020 | Qin ..................... B62D 25/20 |
| 2021/0188069 | A1* | 6/2021 | Friedman ............. B62D 21/09 |

FOREIGN PATENT DOCUMENTS

| JP | 2012164431 A | 8/2012 |
| JP | 2013089448 A | 5/2013 |
| JP | 2017196959 A | 11/2017 |
| KR | 101947831 B1 | 2/2019 |
| KR | 20200094037 A | 8/2020 |

* cited by examiner

*Primary Examiner* — Jason D Shanske
*Assistant Examiner* — James J Triggs
(74) *Attorney, Agent, or Firm* — Slater Matsil, LLP (57) ABSTRACT

An embodiment skateboard platform for an electric vehicle includes a skateboard frame including a center module, a front module connected to a front of the center module, and a rear module connected to a rear of the center module, and a battery assembly mounted on the skateboard frame, wherein the battery assembly is detachably connected to the center module.

20 Claims, 10 Drawing Sheets

SKATEBOARD PLATFORM FOR ELECTRIC VEHICLE

CROSS-REFERENCE TO RELATED APPLICATIONS

This application claims the benefit of Korean Patent Application No. 10-2021-0063642, filed on May 17, 2021, in the Korean Intellectual Property Office, which application is hereby incorporated herein by reference.

TECHNICAL FIELD

The present disclosure relates to a skateboard platform for an electric vehicle.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle includes a battery assembly mounted on a vehicle body. The battery assembly (also referred to as the "battery pack") includes a battery case in which a plurality of battery modules, cooling channels, and other electric/electronic components are assembled. Each battery module includes a plurality of battery cells.

In order to develop a purpose built vehicle (PBV) that satisfies various customers' needs (a flat floor, expansion of an interior space, etc.), electric vehicles in which one or more upper bodies having various structures or shapes share a common skateboard platform are being researched and developed. Such an upper body is also referred to as a "top hat", and the upper body may be of various body styles, such as a crossover, a sedan, and a coupe.

A skateboard platform includes a skateboard frame and a battery assembly mounted on the skateboard frame. However, a conventional skateboard platform has a structure in which the battery assembly overlaps the skateboard frame, which increases weight and cost, and an unnecessary space is created between the skateboard frame and the battery assembly in terms of layout. As a result, the manufacturing cost and weight of the electric vehicle relatively increase.

The above information described in this background section is provided to assist in understanding the background of the inventive concept, and may include any technical concept which is not considered as the prior art that is already known to those skilled in the art.

SUMMARY

The present disclosure relates to a skateboard platform for an electric vehicle. Particular embodiments relate to a skateboard platform for an electric vehicle in which a battery assembly is integrally connected to a center module of a skateboard frame.

Embodiments of the present disclosure can solve problems occurring in the prior art while advantages achieved by the prior art are maintained intact.

An embodiment of the present disclosure provides a skateboard platform for an electric vehicle allowing a battery assembly to be integrally connected to a center module of a skateboard frame, thereby increasing the overall stiffness of a vehicle body which is uniformly distributed through the battery assembly, and reducing the overall number of components which results in reduced weight and cost.

According to an embodiment of the present disclosure, a skateboard platform for an electric vehicle may include a skateboard frame including a center module, a front module connected to the front of the center module, and a rear module connected to the rear of the center module, and a battery assembly mounted on the skateboard frame. The battery assembly may be detachably connected to the center module.

The battery assembly may include an upper panel, a lower panel located below the upper panel, and a plurality of battery modules disposed between the upper panel and the lower panel, and the upper panel and the lower panel may be detachably joined to the center module through fasteners.

The center module may include a pair of center side members each extending in a longitudinal direction of the vehicle, and the upper panel and the lower panel may be detachably joined to the pair of center side members through the fasteners.

The upper panel may have a pair of side walls facing the exterior of the vehicle, and a pair of upper flanges each extending from each side wall toward the exterior of the vehicle, and the pair of upper flanges may be joined to the pair of center side members through the fasteners, respectively.

The side wall may extend from each side edge of the upper panel to a top surface of the center side member, the upper flange may extend from a bottom end of the side wall toward the center side member, and the upper flange may be joined to the top surface of the center side member through the fastener.

The center side member may have a mounting surface recessed from the top surface thereof toward a bottom surface thereof, and the upper flange of the upper panel may be joined to the mounting surface through the fastener.

An upper sealing member may be interposed between the upper flange and the top surface of the center side member.

The side wall may extend from each side edge of the upper panel to a bottom surface of the center side member, the upper flange may extend from a bottom end of the side wall toward the center side member, and the upper flange may be joined to the bottom surface of the center side member through the fastener.

The skateboard platform may further include a center floor panel disposed on the upper panel.

The center floor panel and the upper panel may form a unitary one-piece structure.

A pair of upper body frame members may be disposed on the pair of center side members, and the center floor panel and the pair of upper body frame members may form a unitary one-piece structure.

The lower panel may have a pair of side edges facing the exterior of the vehicle, and a pair of lower flanges extending from the pair of side edges toward the exterior of the vehicle, respectively, and the pair of lower flanges may be joined to the pair of center side members through the fasteners, respectively.

The lower flange may be joined to a bottom surface of the center side member through the fastener.

A lower sealing member may be interposed between the lower flange and the bottom surface of the center side member.

The skateboard platform may further include a reinforcing plate which overlaps and is stacked on the lower panel, and the reinforcing plate may have a plurality of embossing portions protruding toward the upper panel.

A pair of upper body frame members may be disposed on the pair of center side members, the upper panel may have a pair of upper flanges, the lower panel may have a pair of lower flanges, each upper flange may be joined to a top surface of a corresponding center side member, each lower flange may be joined to a bottom surface of a corresponding center side member, and the center side members may be detachably joined to the upper body frame members so that the battery assembly together with the center side members may be detachably joined to the upper body frame members.

The upper panel may have a pair of upper flanges, the lower panel may have a pair of lower flanges, and each upper flange and each lower flange may be detachably joined to a bottom surface of a corresponding center side member through a fastener so that the battery assembly may be detachably joined to the center side members.

The skateboard platform may further include a first joint connecting a rear end of the front module and a front end of the center module by an interference fit, and a second joint connecting a front end of the rear module and a rear end of the center module by an interference fit.

The first joint may include a first engagement portion provided on the front end of the center module, and a first recess provided in the rear end of the front module, and the first engagement portion may be received in the first recess.

The second joint may include a second engagement portion provided on the front end of the rear module, and a second recess provided in the rear end of the center module, and the second engagement portion may be received in the second recess.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
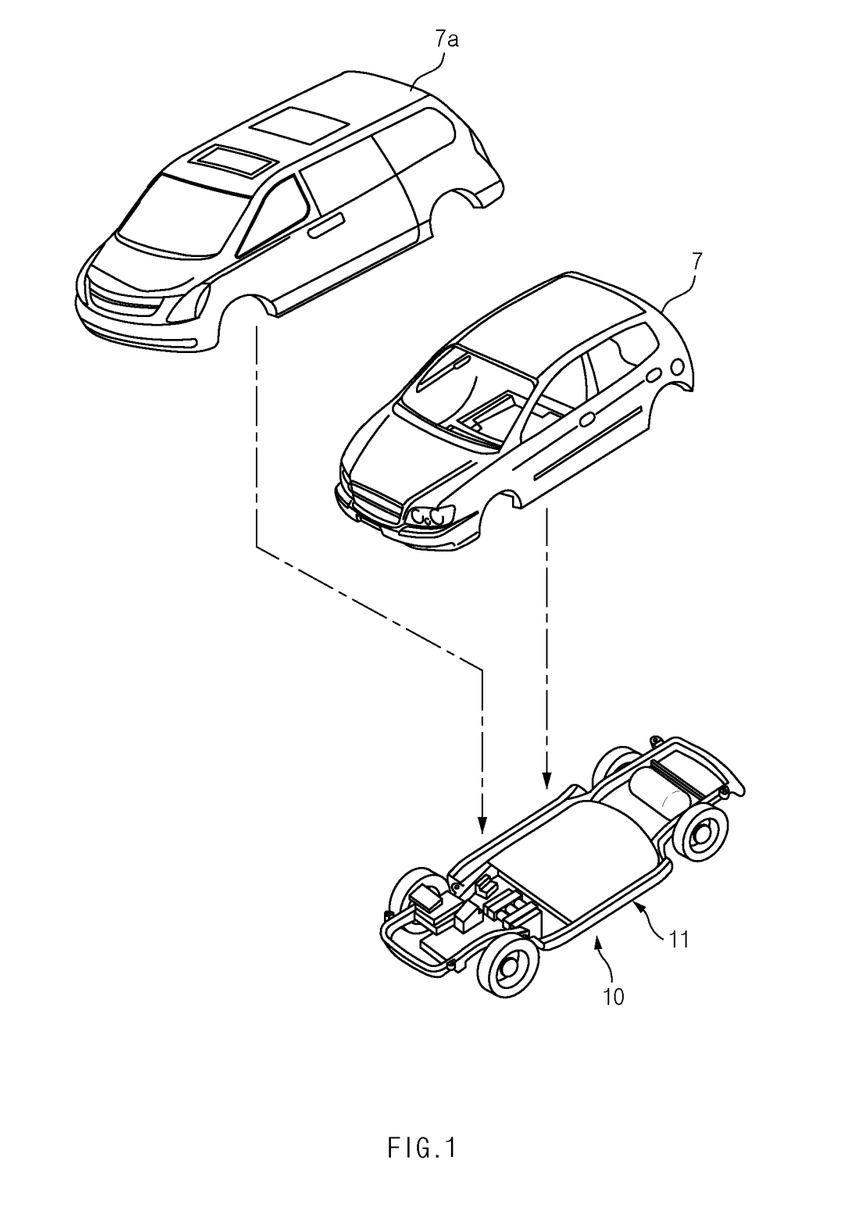
FIG. 1 illustrates a vehicle body structure for an electric vehicle according to an exemplary embodiment of the present disclosure, in which upper bodies are selectively assembled to a skateboard platform.

Referring to FIG. 1, a vehicle body structure for an electric vehicle according to an exemplary embodiment of the present disclosure may include a skateboard platform 10, and one or more upper bodies 7 and 7a selectively assembled onto the skateboard platform 10.

The upper bodies 7 and 7a may also be referred to as the "top hat". One or more upper bodies 7 and 7a having various structures and shapes may be selectively assembled to the skateboard platform 10 so that various upper bodies may share the common skateboard platform 10. FIG. 1 illustrates examples of a sedan-style upper body 7 and a minivan-style upper body 7a selectively assembled to the skateboard platform 10. The upper body may be of various body styles, such as a crossover, a sedan, a coupe, and a minivan.

Figure 2:
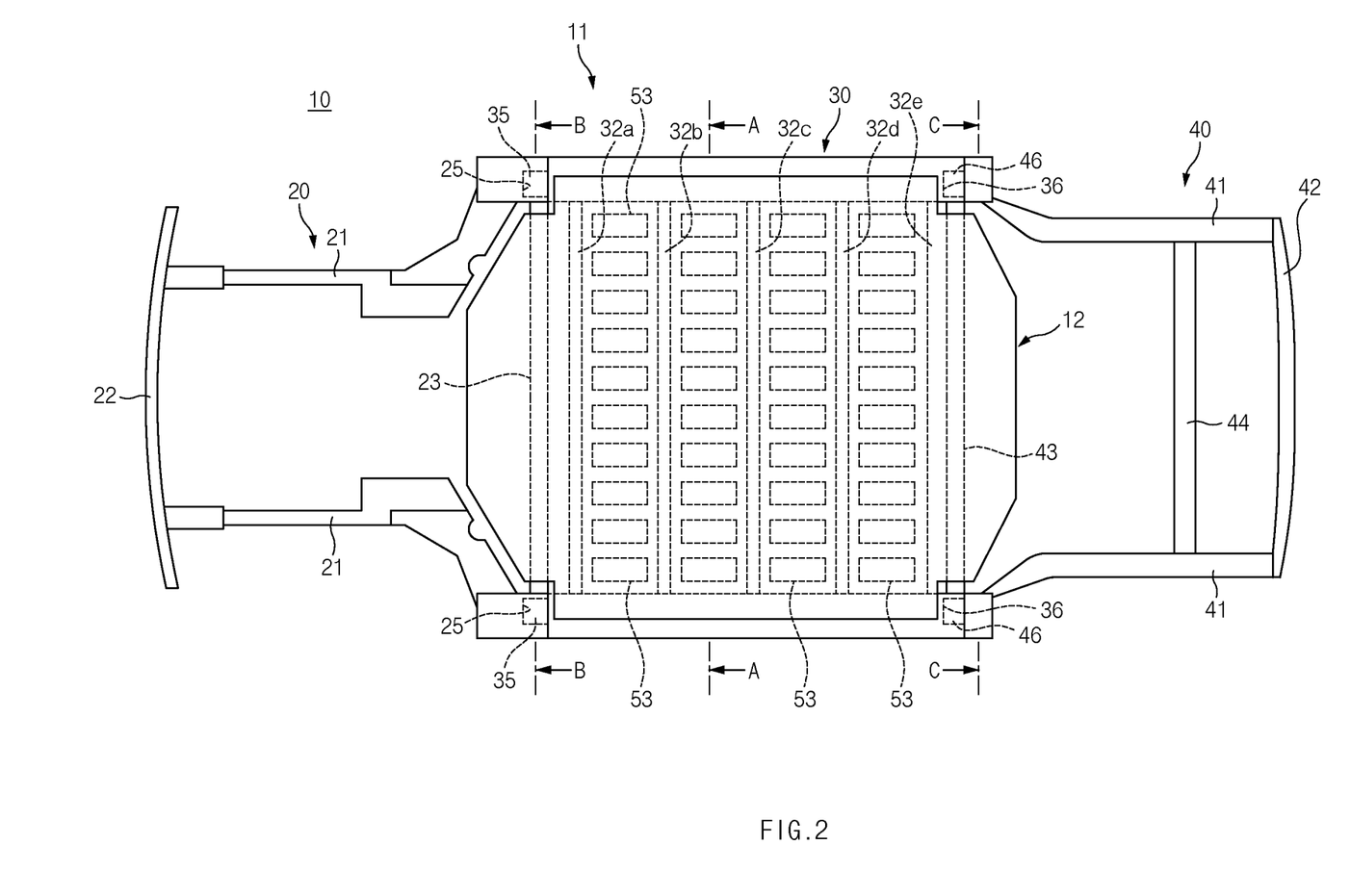
FIG. 2 illustrates a plan view of a skateboard platform for an electric vehicle according to an exemplary embodiment of the present disclosure.
Figure 3:
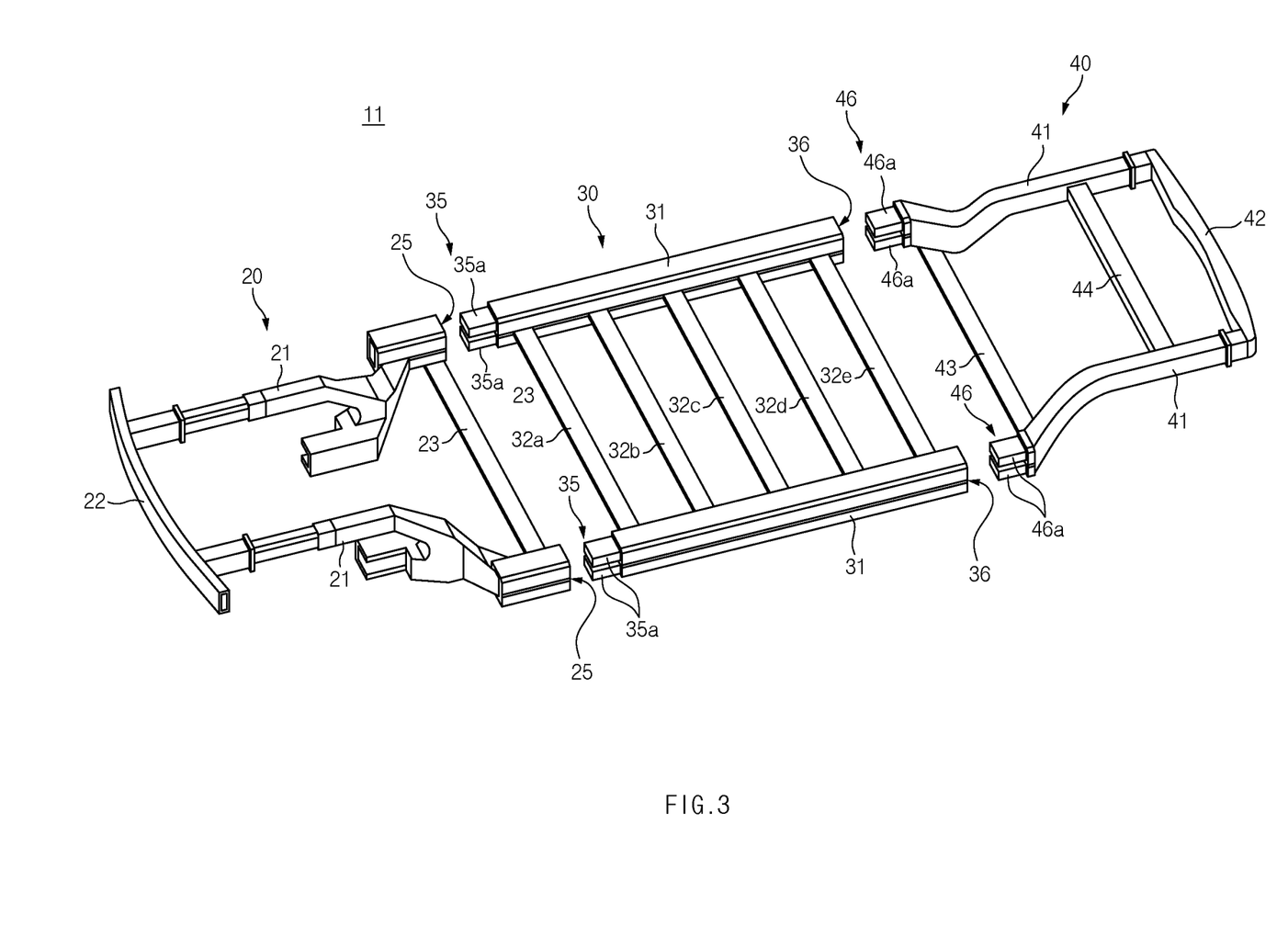
FIG. 3 illustrates a perspective view of a skateboard frame of the skateboard platform for an electric vehicle illustrated in FIG. 2.
Figure 4:
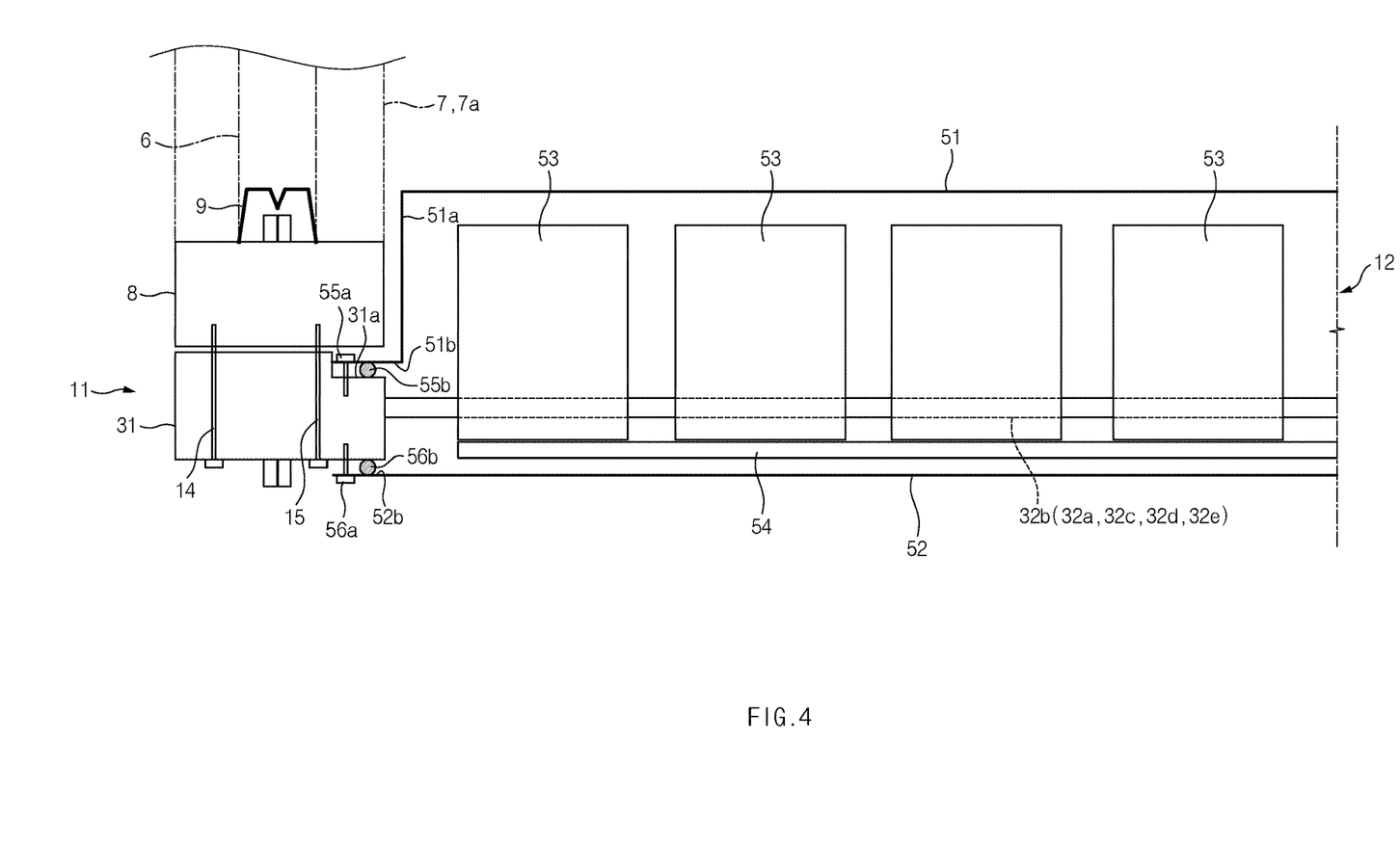
FIG. 4 illustrates a cross-sectional view, taken along line A-A of FIG. 2.

Referring to FIGS. 2 to 4, the skateboard platform 10 for an electric vehicle according to an exemplary embodiment of the present disclosure may include a skateboard frame 11, and a battery assembly 12 detachably mounted on the skateboard frame 11.

The skateboard frame 11 may be a high-stiffness chassis frame to ensure the overall stiffness of a vehicle body. According to an exemplary embodiment, the skateboard frame 11 may include a front module 20, a center module 30, and a rear module 40.

The front module 20 may include a pair of front side members 21, a front bumper 22 disposed on a front end portion of the front module 20, and at least one front crossmember 23 connecting the pair of front side members 21. The pair of front side members 21 may be spaced apart from each other in a width direction of the vehicle, and each front side member 21 may extend in a longitudinal direction of the vehicle. The front bumper 22 may be joined to front end portions of the pair of front side members 21 so that the front end portions of the pair of front side members 21 may be connected through the front bumper 22 in the width direction of the vehicle. The front crossmember 23 may extend in the width direction of the vehicle, and both end portions of the front crossmember 23 may be joined to rear end portions of the pair of front side members 21 so that the rear end portions of the pair of front side members 21 may be connected through the front crossmember 23 in the width direction of the vehicle.

The center module 30 may include a pair of center side members 31, and a plurality of center crossmembers 32a, 32b, 32c, 32d, and 32e connecting the pair of center side members 31. The pair of center side members 31 may be spaced apart from each other in the width direction of the vehicle, and each center side member 31 may extend in the longitudinal direction of the vehicle. Each of the center crossmembers 32a, 32b, 32c, 32d, and 32e may extend in the width direction of the vehicle, and the plurality of center crossmembers 32a, 32b, 32c, 32d, and 32e may be spaced apart from each other in the longitudinal direction of the vehicle. Both end portions of each of the center crossmembers 32a, 32b, 32c, 32d, and 32e may be joined to the pair of center side members 31 so that the pair of center side members 31 may be connected through the plurality of center crossmembers 32a, 32b, 32c, 32d, and 32e in the width direction of the vehicle. The plurality of center crossmembers 32a, 32b, 32c, 32d, and 32e may include a front-side center crossmember 32a disposed on the front of the center module 30, a rear-side center crossmember 32e disposed on the rear of the center module 30, and a plurality of middle-side center crossmembers 32b, 32c, and 32d disposed between the front-side center crossmember 32a and the rear-side center crossmember 32e.

The rear module 40 may include a pair of rear side members 41, a rear bumper 42 disposed on a rear end portion of the rear module 40, and a plurality of rear crossmembers 43 and 44 connecting the pair of rear side members 41. The pair of rear side members 41 may be spaced apart from each other in the width direction of the vehicle, and each rear side member 41 may extend in the longitudinal direction of the vehicle. Each of the rear crossmembers 43 and 44 may extend in the width direction of the vehicle, and the plurality of rear crossmembers 43 and 44 may be spaced apart from each other in the longitudinal direction of the vehicle. Both end portions of the rear crossmember 43 relatively close to the center module 30 may be joined to front end portions of the pair of rear side members 41 so that the front end portions of the pair of rear side members 41 may be connected through the rear crossmember 43 in the width direction of the vehicle. Both end portions of the rear crossmember 44 relatively far from the center module 30 may be joined to middle portions of the pair of rear side members 41 so that the middle portions of the pair of rear side members 41 may be connected through the rear crossmember 44 in the width direction of the vehicle.

The skateboard platform 10 for an electric vehicle according to an exemplary embodiment of the present disclosure may include a first joint connecting a rear end portion of the front module 20 and a front end portion of the center module 30 by an interference fit, and a second joint connecting a front end portion of the rear module 40 and a rear end portion of the center module 30 by an interference fit.

The first joint may include a first engagement portion 35 provided on a front end of each center side member 31 of the center module 30, and a first recess 25 provided in the rear end of each front side member 21 of the front module 20. The first engagement portion 35 may include a plurality of first projections 35a protruding from the front end of the center side member 31 toward the front of the vehicle and having a cantilevered structure. The plurality of first projections 35a may be spaced apart from each other. As the first projections 35a of the first engagement portion 35 are slidably or telescopically received in the first recess 25, the front side member 21 may be temporarily engaged with the front end of the center side member 31. Since the plurality of first projections 35a protruding in a cantilevered manner are spaced apart from each other, the plurality of first projections 35a may be easily received in the first recess 25 of the front side member 21. In a state in which the first engagement portion 35 is received in the first recess 25, the first engagement portion 35 and the first recess 25 may be joined using an adhesive, welding, fasteners (bolts, rivets, etc.) and/or the like, and thus the front module 20 may be easily and firmly joined to the front of the center module 30.

The second joint may include a second engagement portion 46 provided on the front end of each rear side member 41 of the rear module 40, and a second recess 36 provided in a rear end of each center side member 31 of the center module 30. The second engagement portion 46 may include a plurality of second projections 46a protruding from the front end of the rear side member 41 toward the front of the vehicle and having a cantilevered structure. The plurality of second projections 46a may be spaced apart from each other. As the second projections 46a of the second engagement portion 46 are slidably or telescopically received in the second recess 36, the rear side member 41 may be temporarily engaged with the rear end of the center side member 31. Since the plurality of second projections 46a protruding in a cantilevered manner are spaced apart from each other, the plurality of second projections 46a may be easily received in the second recess 36 of the center side member 31. In a state in which the second engagement portion 46 is received in the second recess 36, the second engagement portion 46 and the second recess 36 may be joined using an adhesive, welding, fasteners (bolts, rivets, etc.) and/or the like, and thus the rear module 40 may be easily and firmly joined to the rear of the center module 30.

According to an exemplary embodiment of the present disclosure, the battery assembly 12 may be directly connected to the skateboard frame 11. In particular, the battery assembly 12 may be detachably connected to the center module 30 of the skateboard frame 11. As the battery assembly 12 is directly connected to the skateboard frame 11 ensuring the overall stiffness of the vehicle, the overall stiffness of the vehicle body may be improved and be uniformly distributed through the battery assembly 12, and it may be easy to design the vehicle body. In addition, as the battery assembly 12 is directly connected to the center side members 31 of the center module 30, the number of components may be reduced and the weight and cost may be reduced.

The battery assembly 12 may include an upper panel 51, a lower panel 52 located below the upper panel 51, and a plurality of battery modules 53 or a plurality of battery cells disposed between the upper panel 51 and the lower panel 52. The upper panel 51 and the lower panel 52 may be joined to the center side members 31 of the center module 30 through fasteners.

The plurality of battery modules 53 may be disposed between the upper panel 51 and the lower panel 52. The plurality of battery modules 53 may be received in a receiving space defined by the upper panel 51, the lower panel 52, and the pair of center side members 31. Referring to FIG. 2, the plurality of battery modules 53 may be disposed between the plurality of center crossmembers 32a, 32b, 32c, 32d, and 32e so as not to interfere with the plurality of center crossmembers 32a, 32b, 32c, 32d, and 32e. According to an exemplary embodiment, each battery module 53 may include the plurality of battery cells, and a predetermined number of battery cells may form the single battery module 53.

In addition, the battery assembly 12 may further include a cooling channel 54 for preventing the plurality of battery modules 53 from overheating. The cooling channel 54 may be disposed to contact the plurality of battery modules 53, and the plurality of battery modules 53 may be maintained at an appropriate temperature by a coolant passing through the cooling channel 54.

The upper panel 51 may serve as an upper cover covering the top of the plurality of battery modules 53 and a floor of the vehicle body. The upper panel 51 may have a front edge facing the front of the vehicle, a rear edge facing the rear of the vehicle, and a pair of side edges facing left and right sides of the vehicle.

According to an exemplary embodiment, the upper panel 51 may have a front wall (not shown) facing the front of the vehicle, a rear wall (not shown) facing the rear of the vehicle, and a pair of side walls 51a facing the left and right (exterior) sides of the vehicle. The front wall may extend from the front edge of the upper panel 51 toward the lower panel 52, and the rear wall may extend from the rear edge of the upper panel 51 toward the lower panel 52. The pair of side walls 51a may extend from the side edges of the upper panel 51 toward the lower panel 52, respectively.

Each side wall 51a may face the exterior of the vehicle and each center side member 31 of the center module 30. The side wall 51a may be parallel to an inboard side surface of the center side member 31. A pair of upper flanges 51b may extend from the pair of side walls 51a toward the exterior of the vehicle, respectively. Each upper flange 51b may extend from a bottom end of the corresponding side wall 51a toward the exterior of the vehicle, and the pair of upper flanges 51b may be joined to the center side members 31 of the center module 30 through fasteners, respectively. In particular, each upper flange 51b may be joined to the corresponding center side member 31 through fasteners. FIG. 4 illustrates the left side wall 51a and the left upper flange 51b located on the left side of the upper panel 51. Although not shown, the right side wall 51a and the right upper flange 51b may also be located on the right side of the upper panel 51.

The lower panel 52 may serve as a lower cover supporting and covering the bottom of the plurality of battery modules 53. The lower panel 52 may have a front edge facing the front of the vehicle, a rear edge facing the rear of the vehicle, and a pair of side edges facing the left and right (exterior) sides of the vehicle. The lower panel 52 may have a pair of lower flanges 52b extending from the pair of side edges toward the exterior of the vehicle, respectively. FIG. 4 illustrates the left lower flange 52b located on the left side of the lower panel 52, but the right lower flange 52b may also be located on the right side of the lower panel 52. Each lower flange 52b may extend from each side edge of the lower panel 52 toward the exterior of the vehicle, and the lower flange 52b may be joined to the corresponding center side member 31 of the center module 30 through fasteners.

Referring to FIG. 4, the side wall 51a of the upper panel 51 may extend vertically from each side edge of the upper panel 51 to a top surface of the center side member 31, and the upper flange 51b may extend horizontally from the bottom end of the side wall 51a toward the center side member 31. The upper flange 51b may be aligned with the top surface of the center side member 31, and the upper flange 51b may overlap the top surface of the center side member 31. The upper flange 51b and the top surface of the center side member 31 may be joined through an upper bolt 55a. The lower flange 52b may be aligned with a bottom surface of the center side member 31, and the lower flange 52b may overlap the bottom surface of the center side member 31. The lower flange 52b and the bottom surface of the center side member 31 may be joined through a lower bolt 56a. The upper flange 51b and the lower flange 52b may be spaced apart from each other by a gap corresponding to a thickness of the center side member 31, and the center side member 31 may serve as a side wall between the side edge of the upper panel 51 and the side edge of the lower panel 52. An upper sealing member 55b may be interposed between the upper flange 51b and the top surface of the center side member 31, and a lower sealing member 56b may be interposed between the lower flange 52b and the bottom surface of the center side member 31 so that the side of the upper panel 51 and the side of the lower panel 52 may be joined to the center side member 31 in a sealed manner.

As described above, the battery assembly 12 may be connected to the pair of center side members 31 through the upper flanges 51b of the upper panel 51 and the lower flanges 52b of the lower panel 52 so that the pair of center side members 31 may serve as the pair of side walls located on left and right sides of the battery assembly 12. That is, the battery assembly 12 may be integrally connected to the center side members 31 of the center module 30.

A front portion of the upper panel 51 and a front portion of the lower panel 52 may be joined in a sealed manner, and a rear portion of the upper panel 51 and a rear portion of the lower panel 52 may be joined in a sealed manner. For example, the front wall of the upper panel 51 and the front edge of the lower panel 52 may be joined in a sealed manner, and the rear wall of the upper panel 51 and the rear edge of the lower panel 52 may be joined in a sealed manner. As the upper panel 51 and the lower panel 52 are joined to the corresponding center side members 31 through the sealing members 55b and 56b, the front portion of the upper panel 51 and the front portion of the lower panel 52 are joined in the sealed manner, and the rear portion of the upper panel 51 and the rear portion of the lower panel 52 are joined in the sealed manner, the battery assembly 12 may have the receiving space defined by the upper panel 51, the lower panel 52, and the pair of center side members 31, and accordingly the plurality of battery modules 53, the cooling channel 54, and the like may be received in the receiving space.

Referring to FIG. 4, a pair of upper body frame members 8 may be provided on bottom edges of each of the upper bodies 7 and 7a. FIG. 4 illustrates the left upper body frame member 8 located on the left bottom edge of each of the upper bodies 7 and 7a. Although not shown, the right upper body frame member 8 may be located on the right bottom edge of each of the upper bodies 7 and 7a. Specifically, each upper body frame member 8 may be a side sill extending along each bottom edge of the upper bodies 7 and 7a. Each of the upper bodies 7 and 7a may have a door opening 6 in which a door is mounted, and a sealing member 9 such as a weatherstrip may be mounted along edges of the door opening 6.

The skateboard frame 11 may be joined to the upper body frame member 8 through a plurality of fasteners 14 and 15, and a bottom surface of the upper body frame member 8 may be seated on or supported to a top surface of the skateboard frame 11. Referring to FIG. 4, each center side member 31 of the skateboard frame 11 may be joined to the corresponding upper body frame member 8 through the plurality of fasteners 14 and 15, and the bottom surface of the upper body frame member 8 may be seated on or supported to the top surface of the center side member 31.

According to an exemplary embodiment, the plurality of fasteners 14 and 15 may include a plurality of exterior-side bolts 14 relatively close to the exterior of the vehicle, and a plurality of interior-side bolts 15 relatively close to the interior of the vehicle when viewed from a transverse cross-section of the upper body frame member 8 and a transverse cross-section of the center side member 31. The plurality of exterior-side bolts 14 may be spaced apart from each other in the longitudinal direction of the vehicle, and the plurality of interior-side bolts 15 may be spaced apart from each other in the longitudinal direction of the vehicle. Each exterior-side bolt 14 may be spaced apart from and be aligned with the corresponding interior-side bolt 15 along a width axis of the vehicle. In particular, each exterior-side bolt 14 and the corresponding interior-side bolt 15 may be symmetrical to each other with respect to a vertical central axis of the upper body frame member 8 and the center side member 31. Thus, the upper body frame member 8 and the center side member 31 may be joined by a uniform joining force through the exterior-side bolts 14 and the corresponding interior-side bolts 15.

Figure 5:
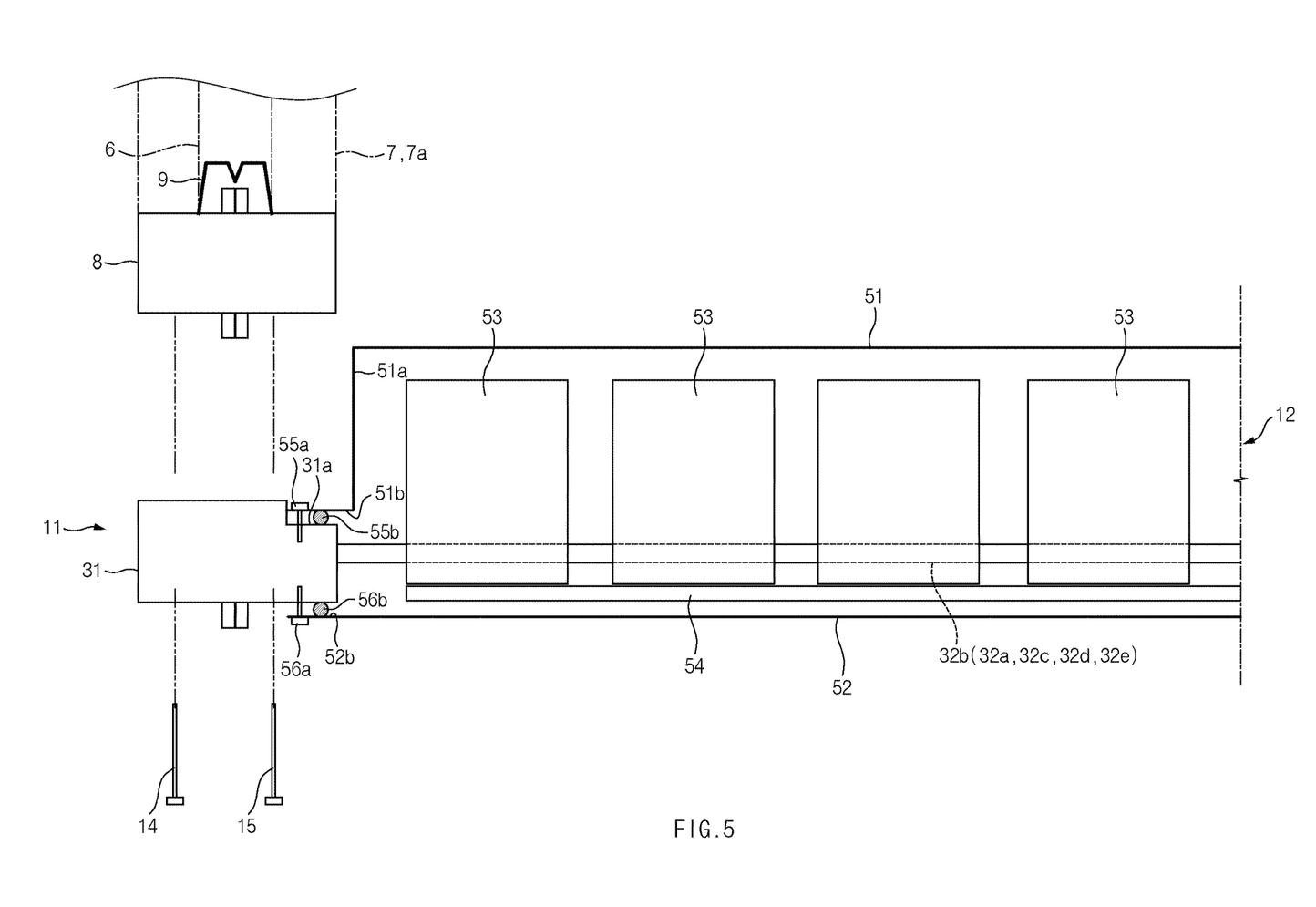
FIG. 5 illustrates the separation of the skateboard frame and a battery assembly from an upper body frame member in the skateboard platform for an electric vehicle illustrated in FIGS. 3 and 4.

Referring to FIG. 5, the battery assembly 12 may be integrally connected to the center side member 31, and the plurality of exterior-side bolts 14 and the plurality of interior-side bolts 15 may be disengaged from the upper body frame member 8 and the center side member 31 so that the center side member 31 may be separated from the upper body frame member 8, and the battery assembly 12 together with the center side member 31 may be quickly and easily separated from the upper body frame member 8. In other words, the battery assembly 12 may be integrally connected to the center side members 31, and the battery assembly 12 and the center side members 31 may be quickly and easily separated from the upper body frame members 8 through the disengagement of the plurality of exterior-side bolts 14 and the plurality of interior-side bolts 15, and thus a swappable battery system may be implemented.

In recent electric vehicles, research and development on the swappable battery system are being carried out, and the swappable battery system is helping to reduce the manufacturer's suggested retail price (MSRP) and taxes by installing a small-capacity battery at the time of vehicle sales, and then replacing it with a large-capacity battery according to customer's needs. In addition, the swappable battery system may reduce the manufacturing cost of the vehicle by removing a charging system such as quick charging equipment, and may allow a discharged battery assembly to be replaced with a charged battery assembly within a relatively short time (within one to two minutes) in an area where infrastructure for quick charging is insufficient.

Figure 6:
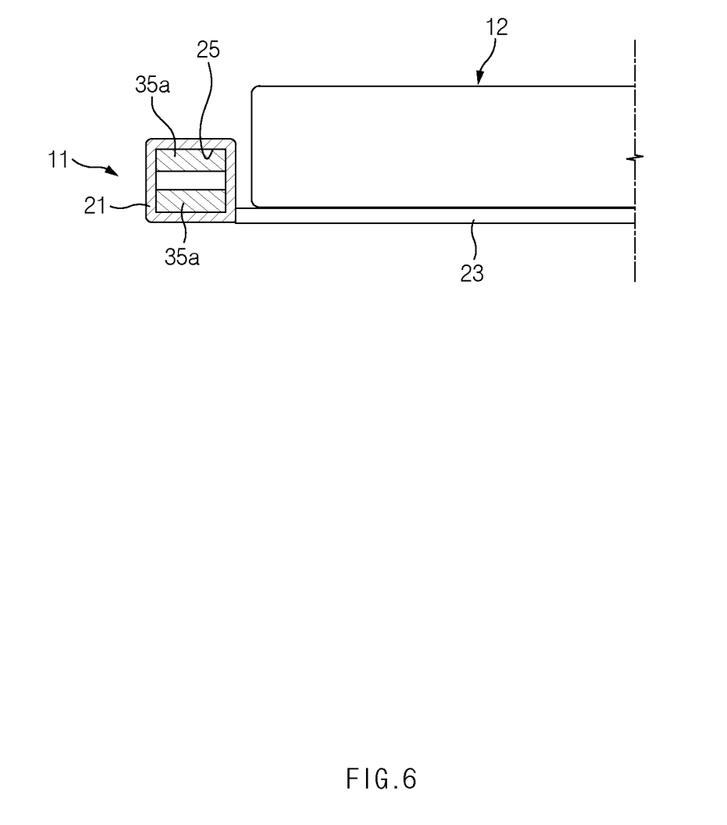
FIG. 6 illustrates a cross-sectional view, taken along line B-B of FIG. 2.

Referring to FIG. 6, the front crossmember 23 may support the bottom of a front portion of the battery assembly 12. Each end portion of the front crossmember 23 may be joined to a bottom end of the corresponding front side member 21, and accordingly a bottom surface of the front crossmember 23 may be aligned with a bottom surface of the front side member 21. That is, the bottom surface of the front crossmember 23 may be flush with the bottom surface of the front side member 21. In particular, the front portion of the lower panel 52 of the battery assembly 12 may be seated on the front crossmember 23, and thus the front portion of the battery assembly 12 may be stably supported to the front crossmember 23.

Figure 7:
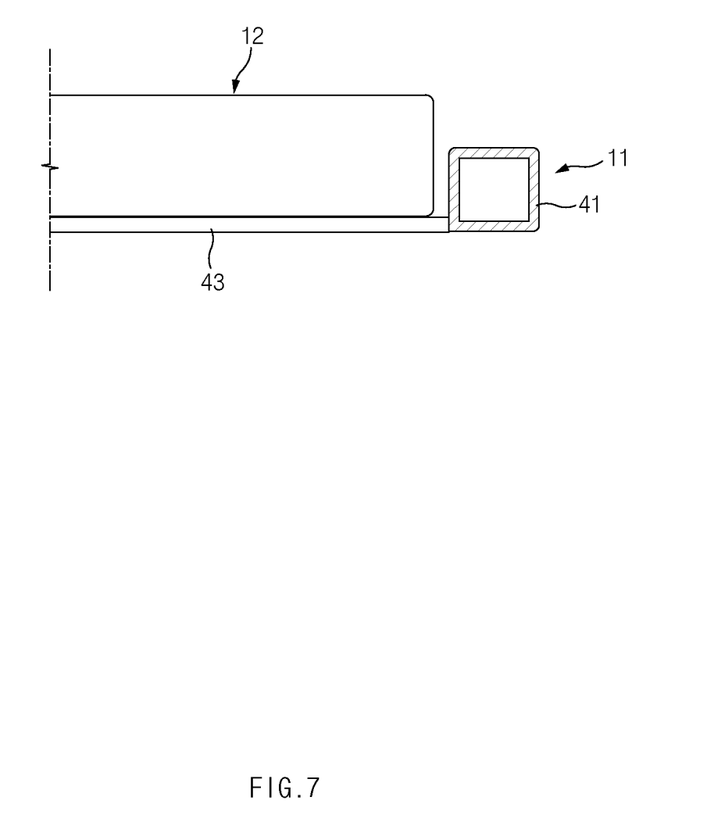
FIG. 7 illustrates a cross-sectional view, taken along line C-C of FIG. 2.

Referring to FIG. 7, at least one rear crossmember 43 of the plurality of rear crossmembers, which is adjacent to the center module 30, may support the bottom of a rear portion of the battery assembly 12. Each end portion of the rear crossmember 43 may be joined to a bottom end of the corresponding rear side member 41, and accordingly a bottom surface of the rear crossmember 43 may be aligned with a bottom surface of the rear side member 41. That is, the bottom surface of the rear crossmember 43 may be flush with the bottom surface of the rear side member 41. The rear portion of the lower panel 52 of the battery assembly 12 may be seated on the rear crossmember 43, and thus the rear portion of the battery assembly 12 may be stably supported to the rear crossmember 43.

Figure 8:
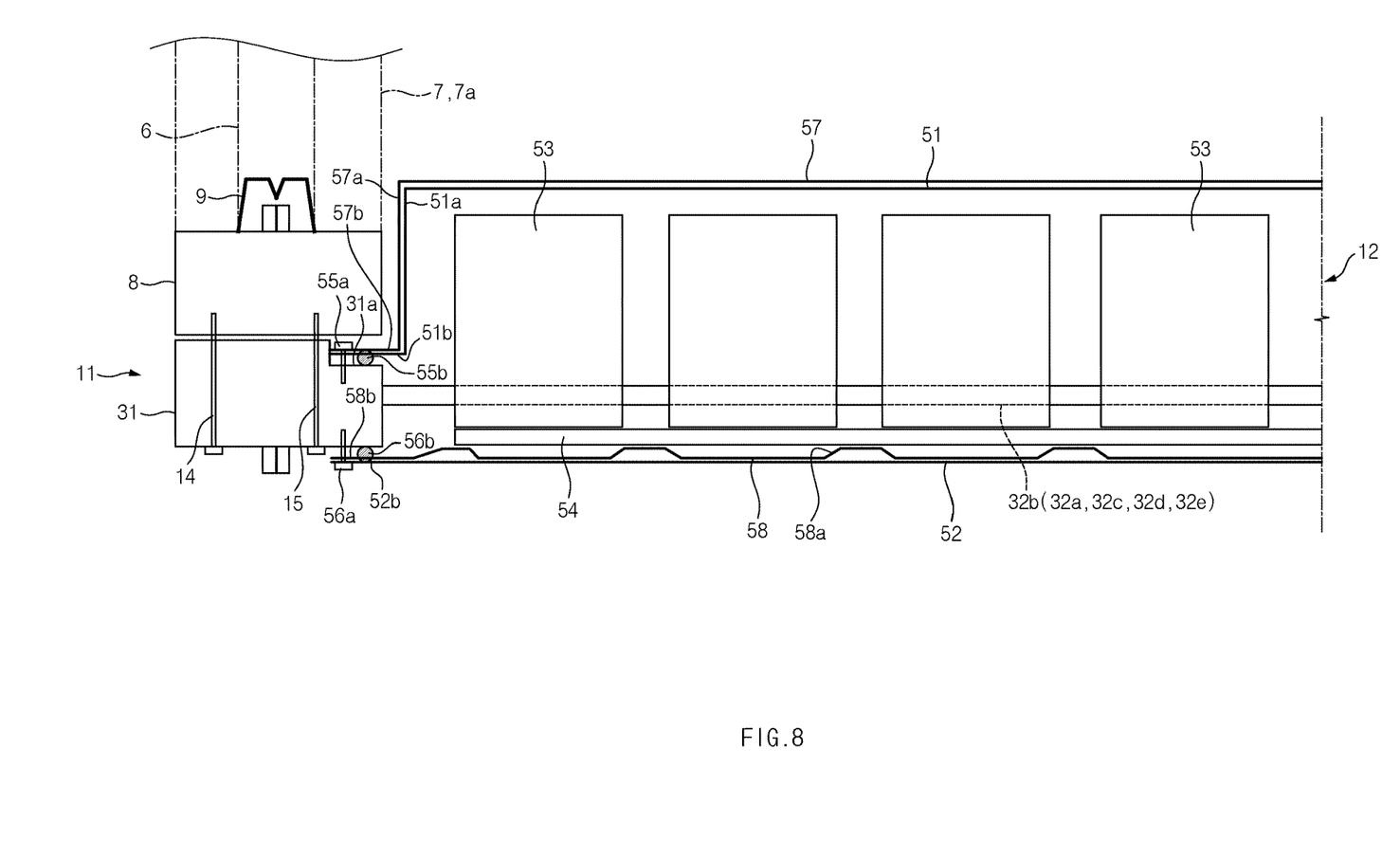
FIG. 8 illustrates a cross-sectional view of a skateboard platform for an electric vehicle according to another exemplary embodiment of the present disclosure.

Referring to FIG. 8, the skateboard platform 10 for an electric vehicle according to an exemplary embodiment of the present disclosure may further include a center floor panel 57 disposed on the upper panel 51 of the battery assembly 12. As the center floor panel 57 overlaps and is stacked on the upper panel 51, the center floor panel 57 may increase the stiffness and strength of the vehicle body and/or the battery assembly 12. The center floor panel 57 may have a pair of side walls 57a facing the exterior of the vehicle, and a pair of flanges 57b extending from the pair of side walls 57a toward the exterior of the vehicle.

The center floor panel 57 may have a front edge facing the front of the vehicle, a rear edge facing the rear of the vehicle, and a pair of side edges facing the left and right (exterior) sides of the vehicle. Each side wall 57a may extend from the side edge of the center floor panel 57 toward the lower panel 52, and each flange 57b may extend from a bottom end of the corresponding side wall 57a toward the exterior of the vehicle. The side wall 57a of the center floor panel 57 may overlap the side wall 51a of the upper panel 51, and the side wall 57a of the center floor panel 57 may be parallel to the side wall 51a of the upper panel 51. The flange 57b of the center floor panel 57 may be aligned with the top surface of the center side member 31. The flange 57b of the center floor panel 57 may overlap the upper flange 51b of the upper panel 51, and the flange 57b of the center floor panel 57 may be parallel to the upper flange 51b of the upper panel 51. The flange 57b of the center floor panel 57 together with the upper flange 51b of the upper panel 51 may be joined to the top surface of the center side member 31 through the upper bolt 55a. According to the exemplary embodiment illustrated in FIG. 8, the center floor panel 57 together with the battery assembly 12 may be integrally connected to the center side members 31 of the skateboard frame 11.

According to an exemplary embodiment, the center floor panel 57 and the upper panel 51 may form a unitary one-piece structure, and thus the center floor panel 57 and the upper panel 51 may form a double plate structure in which they overlap each other.

According to another exemplary embodiment, the center floor panel 57 and the upper panel 51 may be provided as separate pieces, and thus the center floor panel 57 and the upper panel 51 may be joined together using fasteners, welding, and/or the like.

Referring to FIGS. 4 and 8, the center side member 31 may have a mounting surface 31a recessed from the top surface thereof toward the bottom surface thereof, and the upper flange 51b of the upper panel 51 and/or the flange 57b of the center floor panel 57 may be joined to the mounting surface 31a through the upper bolt 55a.

Referring to FIG. 8, the battery assembly 12 may further include a reinforcing plate 58 disposed on the lower panel 52. As the reinforcing plate 58 overlaps and is stacked on the lower panel 52, the reinforcing plate 58 may increase the stiffness and strength of the lower panel 52. The reinforcing plate 58 may have a plurality of embossing portions 58a protruding toward the upper panel 51, and the reinforcing plate 58 may further increase the stiffness and strength of the lower panel 52. The reinforcing plate 58 may have a pair of flanges 58b extending from both side edges thereof toward the exterior of the vehicle. Each flange 58b of the reinforcing plate 58 may overlap the lower flange 52b of the lower panel 52, and the flange 58b of the reinforcing plate 58 may be parallel to the lower flange 52b of the lower panel 52. The flange 58b of the reinforcing plate 58 together with the lower flange 52b of the lower panel 52 may be joined to the bottom surface of the center side member 31 through the lower bolt 56a. The lower sealing member 56b may be interposed between the flange 58b of the reinforcing plate 58 and the bottom surface of the center side member 31.

According to an exemplary embodiment, the reinforcing plate 58 and the lower panel 52 may form a unitary one-piece structure, and thus the reinforcing plate 58 and the lower panel 52 may form a double plate structure in which they overlap each other.

According to another exemplary embodiment, the reinforcing plate 58 and the lower panel 52 may be provided as separate pieces, and the reinforcing plate 58 and the lower panel 52 may be joined together using fasteners, welding, and/or the like.

Referring to FIG. 4, the upper panel 51 may be a flat plate, and the upper panel 51 may be flush with a top surface of the upper body frame member 8 or a top surface of the sealing member 9. Thus, a flat floor of the vehicle may be easily formed.

Referring to FIG. 4, the lower panel 52 may be a flat plate, and the lower panel 52 may be slightly lower than or be flush with the bottom surface of the center side member 31 of the center module 30. Thus, even if the lower portion of the battery assembly 12 is exposed to the outside, the flat lower panel 52 may prevent deterioration of the appearance of the vehicle.

Figure 9:
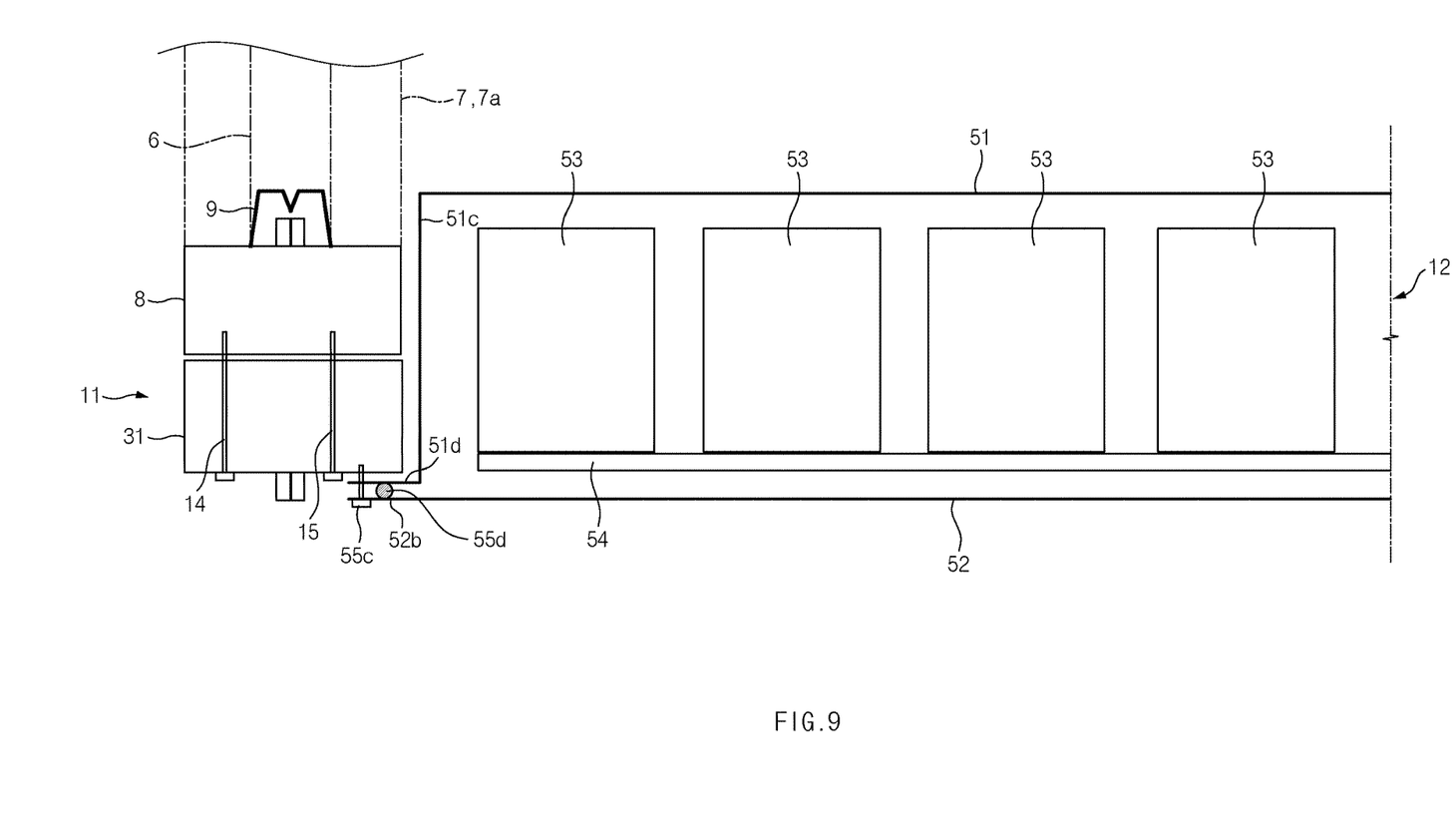
FIG. 9 illustrates a cross-sectional view of a skateboard platform for an electric vehicle according to another exemplary embodiment of the present disclosure.

FIG. 9 illustrates a skateboard platform for an electric vehicle according to another exemplary embodiment of the present disclosure. According to the exemplary embodiment illustrated in FIG. 9, each side wall 51c of the upper panel 51 may extend from each side edge of the upper panel 51 to the bottom surface of the center side member 31, and the side wall 51c of the upper panel 51 may be parallel to an inboard side surface of the upper body frame member 8 and the inboard side surface of the center side member 31. An upper flange 51d may extend horizontally from a bottom end of the side wall 51c toward the exterior of the vehicle. The upper flange 51d may be aligned with the bottom surface of the center side member 31, and the upper flange 51d together with the lower flange 52b of the lower panel 52 may overlap the bottom surface of the center side member 31. The upper flange 51d and the lower flange 52b may be joined to the bottom surface of the center side member 31 through a bolt 55c. A sealing member 55d may be interposed between the upper flange 51d and the lower flange 52b so that the upper flange 51d of the upper panel 51 and the lower flange 52b of the lower panel 52 may be joined in a sealed manner.

Figure 10:
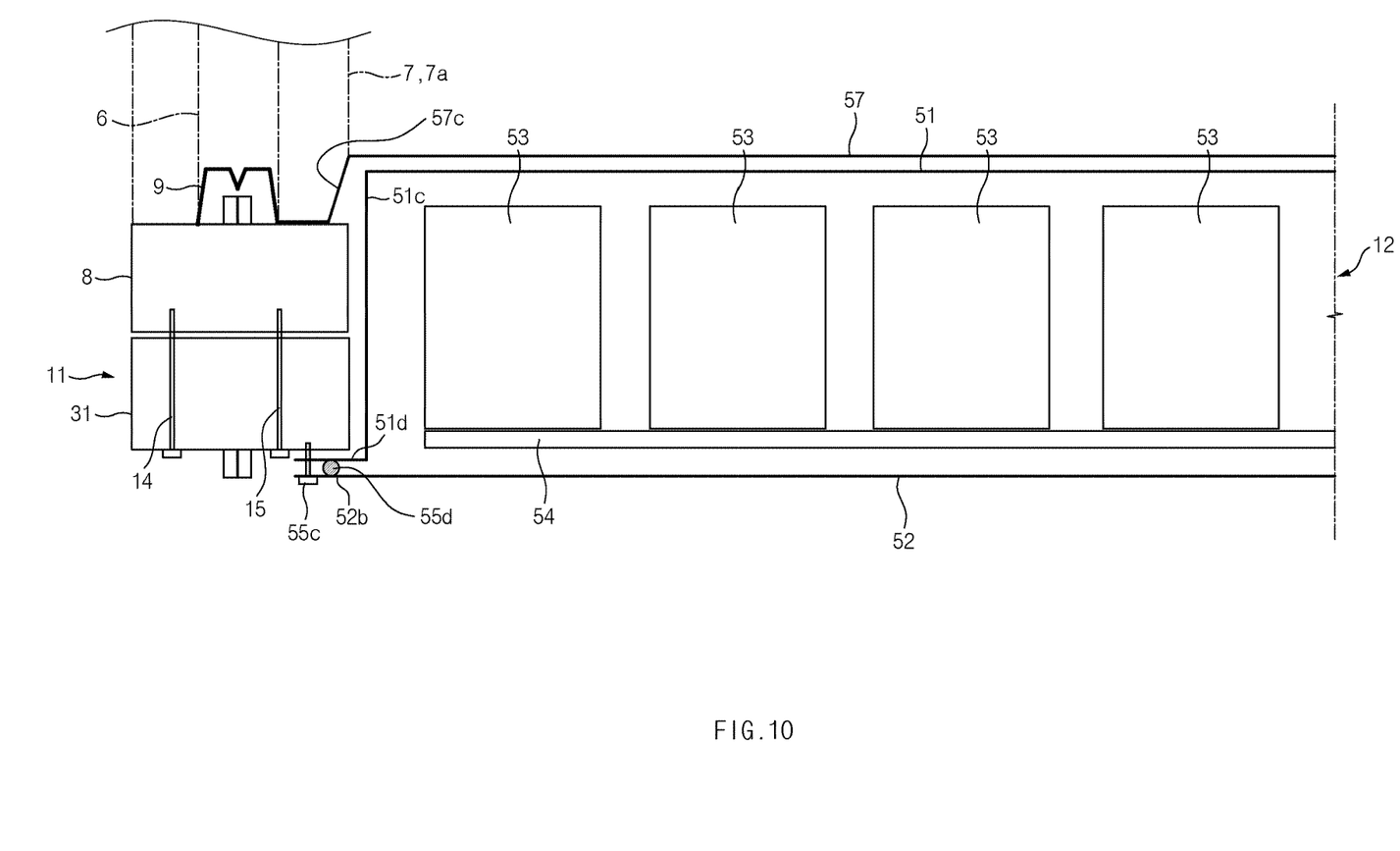
FIG. 10 illustrates a cross-sectional view of a skateboard platform for an electric vehicle according to another exemplary embodiment of the present disclosure.

FIG. 10 illustrates a skateboard platform for an electric vehicle according to another exemplary embodiment of the present disclosure. Referring to FIG. 10, the center floor panel 57 may be disposed on the upper panel 51, and the center floor panel 57 may be integrally connected to the upper body frame member 8. That is, since the center floor panel 57 is connected to the upper body frame member 8 instead of being connected to the battery assembly 12, the upper panel 51 of the battery assembly 12 may only serve as an upper cover covering the top of the plurality of battery modules 53, and the center floor panel 57 may only serve as the floor of the vehicle body.

According to an exemplary embodiment, the center floor panel 57 and the upper body frame members 8 may form a unitary one-piece structure. The center floor panel 57 may have a pair of side walls 57c provided on both side edges thereof, and each side wall 57c may be inclined at a predetermined angle with respect to a vertical axis of the upper body frame member 8. A bottom end of the side wall 57c may be integrally connected to the upper body frame member 8.

According to another exemplary embodiment, the center floor panel 57 and the upper body frame member 8 may be provided as separate pieces, and each flange of the center floor panel 57 may be joined to the top surface of the upper body frame member 8 using fasteners, welding, and/or the like. The flange of the center floor panel 57 may extend from the bottom end of the side wall 57c toward the exterior of the vehicle. The flange of the center floor panel 57 may be aligned with the top surface of the upper body frame member 8, and the flange of the center floor panel 57 may overlap the top surface of the upper body frame member 8.

According to the exemplary embodiments illustrated in FIGS. 9 and 10, as the bolt 55c is disengaged from the center side member 31, the upper panel 51 and the lower panel 52 of the battery assembly 12 may be easily and quickly separated from the center side member 31. Since the battery assembly 12 is easily and quickly separated from the center side member 31 through the disengagement of the bolt 55c, a swappable battery system may be implemented.

As set forth above, the skateboard platform for an electric vehicle, according to exemplary embodiments of the present disclosure, may allow the battery assembly to be integrally connected to the center module of the skateboard frame, thereby increasing the overall stiffness of the vehicle body which is uniformly distributed through the battery assembly, and reducing the overall number of components which results in reduced weight and cost.

In addition, as the battery assembly is integrally connected to the center module of the skateboard frame, the standardization of skateboard platforms for common use may be easily achieved. The skateboard platform according to exemplary embodiments of the present disclosure may easily respond to design changes in vehicle specifications/dimensions (full width, wheelbase, etc.). For example, the size, structure, and shape of the skateboard frame and the battery assembly may be easily variable by the design changes in the vehicle specifications/dimensions (full width, wheelbase, etc.).

In particular, as the battery assembly is connected between the pair of center side members, which are the side structural members of the vehicle body, through the fasteners, the pair of center side members may serve as both side walls of the battery assembly so that the lateral stiffness and lateral strength of the battery assembly may be sufficiently secured by the pair of center side members. That is, the pair of center side members may support a lateral load of the vehicle body and a lateral load of the battery assembly together. Since a separate reinforcement for increasing the stiffness and strength of the battery assembly is not required, the structure of the battery assembly may be simplified, which is advantageous to protection of the battery modules. The battery assembly may be stably protected by the center side members, namely the structural members of the vehicle, and thus crashworthiness of the battery assembly may be improved, and the weight and cost of the battery assembly may be reduced.

The battery assembly may be easily and quickly separated from the center side members so that the swappable battery system may be easily implemented.

In addition, the battery assembly may be integrally connected to the skateboard frame through the center side members, and the skateboard frame may be quickly and easily separated from the upper body frame members, and thus the swappable battery system may be easily implemented, leading to the implementation of a BaaS (battery as a service) business model which allows swapping of battery packs of various capacities. By facilitating the implementation of the swappable battery system, the total cost of ownership of electric vehicles may be minimized in areas where quick charging equipment and charging infrastructure are not established.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A skateboard platform for an electric vehicle, the skateboard platform comprising:
   a skateboard frame including a center module, a front module connected to a front of the center module, and a rear module connected to a rear of the center module; and
   a battery assembly mounted on the skateboard frame, the battery assembly including an upper panel, a lower panel located below the upper panel, and a plurality of battery modules disposed between the upper panel and the lower panel;
   wherein the battery assembly is detachably connected to the center module;
   wherein the center module includes a pair of center side members each extending in a longitudinal direction of the electric vehicle;
   wherein the upper panel and the lower panel are detachably joined to the pair of center side members through fasteners;
   wherein the upper panel has a pair of side walls facing an exterior of the electric vehicle and a pair of upper flanges each extending from each side wall toward the exterior of the electric vehicle; and
   wherein the pair of upper flanges are joined to the pair of center side members through the fasteners, respectively.

2. The skateboard platform according to claim 1, wherein:
   the side walls extend from a side edge of the upper panel to a bottom surface of the center side members, respectively;
   the upper flanges extend from a bottom end of the side walls toward the center side members, respectively; and
   the upper flanges are joined to the bottom surface of the center side members through the fasteners, respectively.

3. The skateboard platform according to claim 1, wherein:
   the side walls extend from a side edge of the upper panel to a top surface of the center side members, respectively;
   the upper flanges extend from a bottom end of the side walls toward the center side members, respectively; and
   the upper flanges are joined to the top surface of the center side members through the fasteners, respectively.

4. The skateboard platform according to claim 3, wherein:
   the center side members each have a mounting surface recessed from the top surface thereof toward a bottom surface thereof, and
   the upper flanges of the upper panel are joined to the mounting surfaces through the fasteners, respectively.

5. The skateboard platform according to claim 3, wherein a pair of upper sealing members are interposed between the upper flanges and the top surfaces of the center side members, respectively.

6. The skateboard platform according to claim 1, wherein:
   a pair of upper body frame members are disposed on the pair of center side members;
   the lower panel has a pair of lower flanges;
   each of the upper flanges is joined to a top surface of a corresponding one of the center side members;
   side members;
   each of the lower flanges is joined to a bottom surface of a corresponding one of the center side members; and
   the center side members are detachably joined to the upper body frame members so that the battery assembly together with the center side members is detachably joined to the upper body frame members.

7. The skateboard platform according to claim 1, wherein:
   the lower panel has a pair of lower flanges; and
   each of the upper flanges and each of the lower flanges are detachably joined to a bottom surface of a corresponding one of the center side members through a fastener so that the battery assembly is detachably joined to the center side members.

8. The skateboard platform according to claim 1, further comprising a center floor panel disposed on the upper panel.

9. The skateboard platform according to claim 8, wherein the center floor panel and the upper panel form a unitary one-piece structure.

10. The skateboard platform according to claim 8, wherein:
    a pair of upper body frame members are disposed on the pair of center side members; and
    the center floor panel and the pair of upper body frame members form a unitary one-piece structure.

11. The skateboard platform according to claim 1, further comprising a reinforcing plate overlapping and stacked on the lower panel, wherein the reinforcing plate has a plurality of embossing portions protruding toward the upper panel.

12. A skateboard platform for an electric vehicle, the skateboard platform comprising:
    a skateboard frame including a center module, a front module connected to a front of the center module, and a rear module connected to a rear of the center module; and
    a battery assembly mounted on the skateboard frame, wherein the battery assembly is detachably connected to the center module, the battery assembly including an upper panel, a lower panel located below the upper panel, and a plurality of battery modules disposed between the upper panel and the lower panel, the upper panel and the lower panel being detachably joined to the center module through fasteners;
    wherein the center module includes a pair of center side members each extending in a longitudinal direction of the electric vehicle;

wherein the upper panel and the lower panel are detachably joined to the pair of center side members through the fasteners;

wherein the lower panel has a pair of side edges facing an exterior of the electric vehicle, and a pair of lower flanges extending from the pair of side edges toward the exterior of the electric vehicle, respectively; and wherein the pair of lower flanges are joined to the pair of center side members through the fasteners, respectively.

13. The skateboard platform according to claim 12, wherein the lower flanges are joined to a bottom surface of the center side members through the fasteners, respectively.

14. The skateboard platform according to claim 13, wherein a pair of lower sealing members are interposed between the lower flanges and the bottom surface of the center side members, respectively.

15. The skateboard platform according to claim 12, wherein:
  a pair of upper body frame members are disposed on the pair of center side members;
  the upper panel has a pair of upper flanges;
  the lower panel has a pair of lower flanges;
  each of the upper flanges is joined to a top surface of a corresponding one of the center side members;
  each of the lower flanges is joined to a bottom surface of a corresponding one of the center side members; and
  the center side members are detachably joined to the upper body frame members so that the battery assembly together with the center side members is detachably joined to the upper body frame members.

16. The skateboard platform according to claim 12, wherein:
  the upper panel has a pair of upper flanges;
  the lower panel has a pair of lower flanges; and
  each of the upper flanges and each of the lower flanges are detachably joined to a bottom surface of a corresponding one of the center side members through a fastener so that the battery assembly is detachably joined to the center side members.

17. The skateboard platform according to, claim 12, further comprising a center floor panel disposed on the upper panel, wherein the center floor panel and the upper panel form a unitary one-piece structure.

18. A skateboard platform for an electric vehicle, the skateboard platform comprising:
  a skateboard frame including a center module, a front module connected to a front of the center module, and a rear module connected to a rear of the center module;
  a battery assembly mounted on the skateboard frame, wherein the battery assembly is detachably connected to the center module;
  a first joint connecting a rear end of the front module and a front end of the center module by an interference fit; and
  a second joint connecting a front end of the rear module and a rear end of the center module by an interference fit;
  wherein the battery assembly includes an upper panel, a lower panel located below the upper panel, and a plurality of battery modules disposed between the upper panel and the lower panel;
  wherein the center module includes a pair of center side members each extending in a longitudinal direction of the electric vehicle;
  wherein the upper panel and the lower panel are detachably joined to the pair of center side members through fasteners;
  wherein the upper panel has a pair of side walls facing an exterior of the electric vehicle, and a pair of upper flanges each extending from each side wall toward the exterior of the electric vehicle; and
  wherein the pair of upper flanges are joined to the pair of center side members through the fasteners, respectively.

19. The skateboard platform according to claim 18, wherein:
  the first joint includes a first engagement portion provided on the front end of the center module and a first recess provided in the rear end of the front module; and
  the first engagement portion is configured to be received in the first recess.

20. The skateboard platform according to claim 18, wherein:
  the second joint includes a second engagement portion provided on the front end of the rear module and a second recess provided in the rear end of the center module; and
  the second engagement portion is configured to be received in the second recess.

* * * * *

UNITED STATES PATENT AND TRADEMARK OFFICE
CERTIFICATE OF CORRECTION

PATENT NO. : 11,745,798 B2
APPLICATION NO. : 17/507069
DATED : September 5, 2023
INVENTOR(S) : Ho Sung Kwon

Page 1 of 1

It is certified that error appears in the above-identified patent and that said Letters Patent is hereby corrected as shown below:

In the Claims

In Column 14, in Claim 6, Line 22, delete "side members;".

Signed and Sealed this
Fifth Day of December, 2023

Katherine Kelly Vidal
*Director of the United States Patent and Trademark Office*